H. C. COLBURN.
WATER COOLING APPARATUS FOR THE EXPLOSIVE MIXTURE OPERATING MOTORS OF AUTOMOBILES AND OTHER VEHICLES.
APPLICATION FILED MAR. 31, 1911.
1,084,845.
Patented Jan. 20, 1914.
2 SHEETS—SHEET 1.
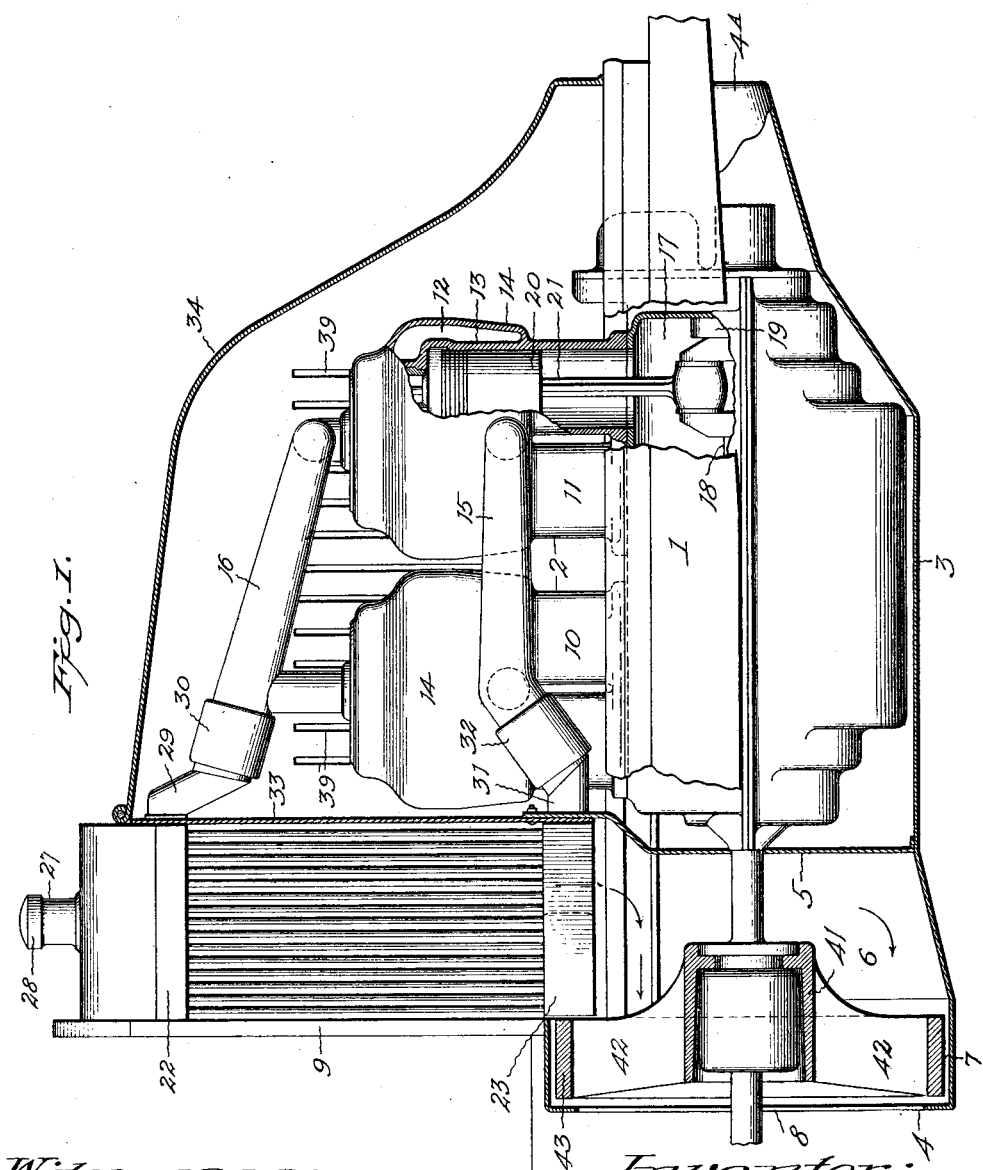

H. C. COLBURN.
WATER COOLING APPARATUS FOR THE EXPLOSIVE MIXTURE OPERATING MOTORS OF AUTOMOBILES AND OTHER VEHICLES.
APPLICATION FILED MAR. 31, 1911.
1,084,845.
Patented Jan. 20, 1914.
2 SHEETS—SHEET 2.
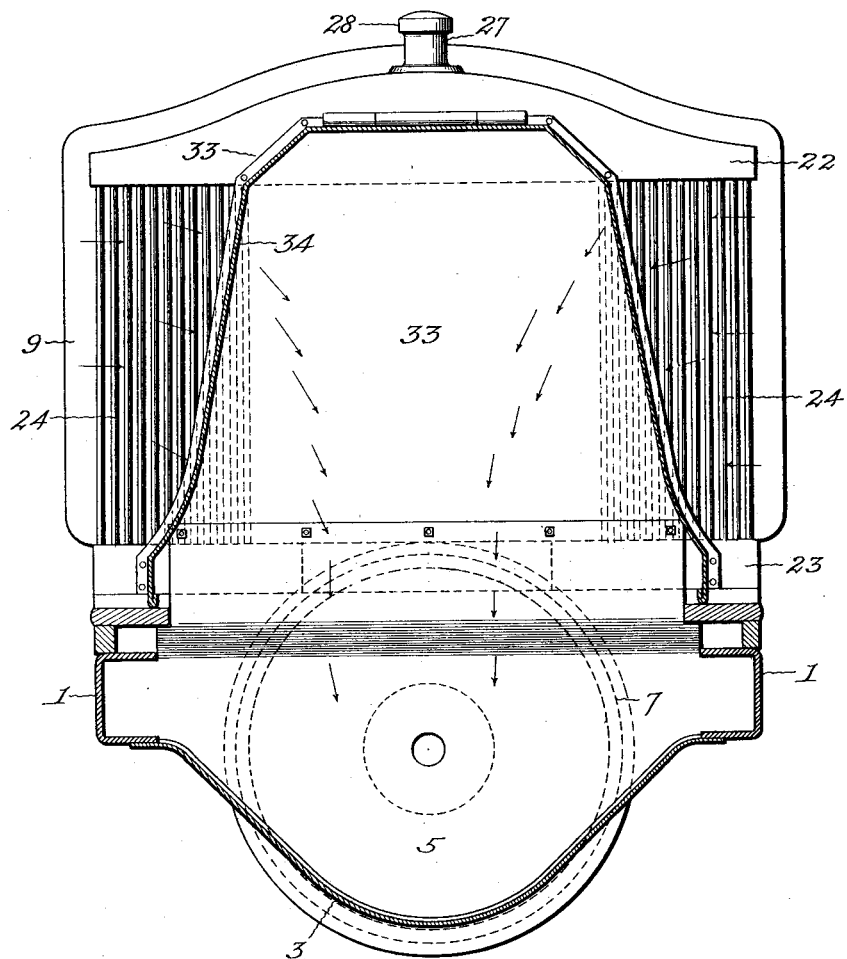
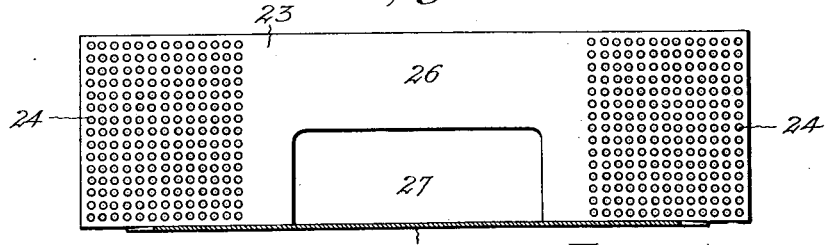

UNITED STATES PATENT OFFICE.

HERBERT C. COLBURN, OF DENVER, COLORADO, ASSIGNOR TO THE COLBURN AUTOMOBILE COMPANY, OF DENVER, COLORADO, A CORPORATION.

WATER-COOLING APPARATUS FOR THE EXPLOSIVE-MIXTURE-OPERATING MOTORS OF AUTOMOBILES AND OTHER VEHICLES.

1,084,845.  Specification of Letters Patent.  Patented Jan. 20, 1914.

Application filed March 31, 1911. Serial No. 618,167.

*To all whom it may concern:*

Be it known that I, HERBERT C. COLBURN, a citizen of the United States of America, residing in the city and county of Denver and State of Colorado, have invented a new and useful Water-Cooling Apparatus for the Explosive-Mixture-Operating Motors of Automobiles and other Vehicles, of which the following is a specification.

My invention relates to improvements in water cooling apparatus for the explosive mixture operating motors of automobiles, and other vehicles, and the objects of my invention are: First, to provide a water cooling apparatus in which radiator surfaces are exposed to the atmosphere, and are provided with air passages free from air baffling, diverging, or directing plates, and in which the motor and its incasing hood, the dash board and the water cooling apparatus, are so relatively arranged that dust laden air is completely excluded from entering the incasing hood of the motor, and thus prevents the dust from settling on and working into the working parts of the engines of the motor. Second, to provide a water cooling apparatus for motor driven vehicles in which cool atmospheric air is drawn into and is confined to the hot water containing portions of the water cooling apparatus, as long as it is drawn through it and until it is discharged into the atmosphere and is prevented from entering the motor's incasing hood and mingling with the radiating heat of the engine therein, and thus becoming superheated and losing by such intermingling a large portion of its water cooling element; and third, to provide a simple, inexpensive, water cooling apparatus that is self-contained and accessible in all its parts, and that is quickly and easily attached to and placed in operative and coöperative relation to the water jacketed cylinders of the engine of the motors of automobiles.

I attain these objects by the mechanism illustrated in the accompanying drawings, in which:

Figure 1 is a view partly in side elevation and partly in section, of the forward portion of an automobile, showing the arrangement of my improved cooling device. Fig. 2, is a transverse sectional view of the same, omitting the engine and crank casing. And Fig. 3, is a plan view of the lower water tank.

Similar letters of reference refer to similar parts throughout the several views.

Referring to the drawings, the numeral 1 designates the frame portion of the front end of an automobile. Upon this frame I mount an internal combustion motor 2, and below the motor a pan 3 is placed, and is secured to the bottom of the frame and its opposite end portions 4 and 4<sup>A</sup> are turned upward. The end 4<sup>A</sup> being closed and the pan is made air-tight enough to keep sand and dust from the rear end of the motor by a partition 5 which is placed at a short distance from the end 4 of the pan. This transverse partition 5 is secured to the inside bottom portion of the pan, and extends across the pan and upwardly to and above the frame 1, and is arranged to connect with the bottom portion of a radiator. The end 4 of the pan is arranged to form a housing for a fan 7, and a portion of its end is open to the atmosphere, as will be explained more fully hereinafter. This partition forms a chamber 6, between the end wall 4 of the pan and the partition, which is arranged and adapted to form a housing for a suction fan 7, that is arranged to be driven by the motor. The end 4 of the pan is provided with an aperture 8, which is arranged to permit the suction fan to discharge air from the chamber 6 through it into the atmosphere, and the end portion of the pan is also housed around the rim of the fan and the fan is mounted in such relation thereto as to prevent eddying or swirling currents of air from flowing past the discharge end of the fan through its discharge aperture, which would in a measure reduce its full air suction drawing capacity. A dash-board 9 is mounted on and secured to the frame 1 at a short distance to the rear of the motor, and above the suction fan and its housing. This dash-board separates the motor and coöperating parts and their housings from the chauffeur and the passenger portion of the automobile, and it also forms the support and the rear end plate or back portion of the radiator portion of my improved water cooling apparatus.

My invention contemplates a hot water cooling radiator that is adapted to be connected to and used with any type or character of an explosive mixture operating motor having water jacketed cylinders and cylinder heads. I have, however, preferably illustrated my water cooling apparatus connected to a four-cycle, four-cylinder gasolene engine, the cylinders 10 and 11 of which are preferably cast in pairs and are water jacketed at their upper ends. These water jackets preferably consist of water passages 12, formed between and around the shell 13 of the cylinders and an outer shell 14, that is formed around the shell 13 and at a sufficient distance from the shell 13 to form water holding passages of area enough to hold a sufficient amount of water to keep the cylinders operatively cool when the water is circulated through a water cooling radiator of sufficient and properly arranged radiating surfaces.

A water conveying pipe 15 is connected by suitable fittings to the lower portion of the water passages around each pair of cylinders, and a water conveying pipe 16 is also connected to the top of the water passages by suitable fittings at the top portions of each pair of cylinders. These water conveying pipes are adapted to be connected to my improved water cooling radiator, as will be fully explained hereinafter.

A crank case 17 is secured to the lower ends of the cylinders, and a crank shaft 18 is rotatably mounted in the crank case in suitable journal boxes 19 formed therein. This crank shaft is rotatably driven by suitable pistons 20 and piston rods 21, which are operatively mounted in the cylinders and connected to the crank shaft. This crank shaft extends rearwardly from the crank case through the partition 5 and the aperture 8 in the wall 4 to the rear portion of the automobile, where it is connected to mechanism adapted to impart a controllable running movement to the automobile. I do not illustrate this mechanism as it does not form a part of my present invention. This partition 5 is arranged in such relative relation to the rear end 4 of the pan as to form a suitable housed chamber for a suction fan 7, which I have heretofore described.

My improved air circulating water cooling radiator comprises an upper water holding tank 22 and a lower water holding tank 23, which are connected together by two independent groups of water holding and heat radiating tubes 24. These two tanks are substantially rectangular in shape and they are made long enough to extend entirely across the dash-board, and are secured to it and to the frame by angled brackets or other suitable means. These two independent groups of tubes are placed at a sufficient distance from the center and the immediate central portion of the tanks to form a vertical air passageway 26 between them, from below the under side of the upper tank to the lower tank, which is provided with a recessed open space 27 formed in its front side at the central portion of its length that extends into the tank a portion of its width. This open space in the lower tank registers with and forms a straight, vertical, unobstructed air shaft or passageway from the under side of the upper tank through the radiator into the chamber 6 of the suction fan and to the suction fan.

The upper tank 22 is provided with a water inlet nipple 27, to the top of which a cap 28 is removably fitted, to be easily removed and replaced by an attendant. The upper tank is connected by suitable pipe connections 29, including a suitable coupling band 30, which is preferably an elastic band, with the water circulating pipe 16, that extends to the top portion of the cylinders of the motor. The lower tank is also provided with suitable pipe fittings 31, including a coupling band 32, and is connected to the pipe 15 that connects with the lower portions of the water passages of the cylinders of the motor.

The two independent vertical groups of tubes are each preferably arranged in a square shaped block form of tubes and the individual tubes of each group are preferably positioned at a sufficient distance apart from each other to permit atmospheric air to be drawn readily between and around them into the central vertical air passageway between the two groups of tubes, as will be fully explained hereinafter.

The dash-board acts as a rear side plate or wall between the two water tanks and closes the space between their rear sides, and their front sides are closed at the central portion of their lengths by a plate 33, which is connected to the front side of the upper tank and extends to and covers the front side portion of the lower tank, and across its air passageway 26 below the lower tank, and is bolted or riveted to the top of the partition plate 5 which overlaps it, the ends of the plate 33 being secured to the tanks 22 and 23; consequently this front plate 33 and the partition 5 form together a complete partition between the radiator and the motor and the rear end of its incasing hood. This front plate 33 is made wide enough above the lower tank to cover and close in the vertical air shaft passageway 26 and to overlap a few of the adjacent outside tubes on the front side portion of each of the two groups of tubes, which arrangement of the plate leaves almost all of the front side of the tubes of each group of tubes exposed to the atmosphere. The outside ends of each group of tubes are also exposed to the atmosphere.

The motor is surrounded by an incasing hood 34, which rests on the frame 1. This hood is preferably of a converging inwardly curved wedge shaped form in outline from its base flange to its top, which is preferably flat. The base of the hood preferably consists of a molding, the bottom rim of which is fitted to lie flat on the frame and is detachably secured to it by any suitable fastening means, by which the hood is held tightly enough to the frame to practically exclude sand and dust from entering under its base edge to the motor. The rear end of the hood extends to and up against the front plate of the radiator, and its top flat rear edge is pivotally hinged to the front plate along the front side of the upper tank. The side edges of the hood are arranged to bear with their rear edges against the outer edge portion of the plate 33, which is preferably given the same form as the downwardly sloping sides of the hood.

The front plate 33 of the radiator is an imperforate plate that effectually prevents any sand or dust that enters its central, downwardly extending, vertical air passage from drifting into the hood and to the engines of the motor.

The upwardly sloping front end and the upwardly converging wedge form of sides of the hood prevent the hood from acting as a wind break to keep the air from striking the front side of the radiator tubes when the automobile is running ahead, as the hood slopes away from the tubes on its front side and leaves the front tubes so exposed that they receive the full force of either head or cross currents of air.

The front plate 33 of the radiator and its coöperating partition 5 prevents any of the dust laden air that enters the air shaft of the radiator from entering the hood and consequently from flowing to the motor. This front plate also prevents the heat of radiation from the motor that collects within the hood from entering the radiator shaft. In order to allow this heat to escape from the hood, I provide its opposite sides with a plurality of apertures 39, which are arranged to permit this radiated heat from the motor to escape to the atmosphere. These apertures are shielded by the usual projecting, backwardly extending lips, which direct sand and dust away from the apertures.

The suction fan 7 is preferably made in the form of a combined suction fan and flywheel, and consists of a hub portion 41, spirally arranged blade shaped spokes 42, and a thick, heavy rim portion 43, the spokes being arranged to draw by suction air from the vertical air passage of the radiator and discharge it through the opening 8 in the end wall 4 of the casing. The fan and its chamber are arranged far enough to the rear of the lower tank of the radiator and of the lower edge of the dashboard to allow the vertical air passage through the lower tank to extend directly into the front end portion of the fan's chamber 6, which permits the fan to draw a straight downward current of air from the outside atmosphere through the air spaces between the tubes and through the vertical shaft between the adjacent sides of the dashboard.

The operation of my improved air circulating water cooling apparatus is as follows: A supply of water sufficient to practically fill the water jacket passages that surround the cylinders of the motor and their circulating pipes and the radiator is poured into the upper tank through its inlet. Then when the motor is started to running the heat of combustion generated by successive explosions of the explosive mixture, used as an actuating fluid for the motor, heats the jacket water hot and it starts to circulate through its upper pipe 16 to the upper tank 22 down through the two groups of tubes into the lower tank 23, and from it through the lower pipe 15 back to the lower part of the water passages in the water jackets. Meanwhile the fan which started to rotate when the motor was started up draws the cool atmospheric air through the air spaces between the tubes of each group of tubes of the radiator, drawing it into the tubes of each group through the spaces at their front sides and ends into the central downward vertical unobstructed air shaft passageway between the groups of tubes and the dashboard and front plate of the radiator through the air recess in the bottom tank into its chamber 6 and into its blades which force it out into the atmosphere under the frame 1.

The essential features of my invention are as follows: First—it draws air from the atmosphere through the spaces between the two groups of tubes into a central vertical passageway that extends directly to the fan, and this passageway is free from air baffling or directing plates or surfaces, which whenever present retard its movement and give off to it a portion of their heat which they absorb from the heat radiated from the engine and thus in a measure destroy the cooling influence of the air on the heat radiating surfaces of the radiator. Second—this air passageway from the outside atmosphere through the radiator to the fan is completely separated from the hot air surrounding the motor within the hood, and does not in the least enter the hood or receive a neutralizing heat from the hot air in the hood that radiates from the motor, as do the cooling radiators in use that direct the air from the radiator into and through the rear end of the hood by baffle plates and tortuous passageway and third—to prevent the sand, grit, dust, and dirt laden air that is drawn into the radiator's air passageway by the fan from flowing into the hood to the motor, as in all cooling systems where this takes place the sand, grit and dust collects on the motor and often works into and clogs and cuts into its working parts.

My water cooling apparatus is simple in construction and effective in applying directly to the heat radiating surfaces of the radiator all of the cooling elements of rapidly moving cool air that is led to absorb only such heat as radiates from the surfaces of the radiator, and while I have illustrated and described the preferred construction and arrangement of my water cooling apparatus, I do not wish to be confined to them, as many changes might be made without departing from the spirit of my invention.

Having described my invention, what I claim as new and desire to secure by Letters Patent is:

A water cooling apparatus for motors of motor vehicles, comprising a dash-board, upper and lower water tanks secured to said dash-board, banks of vertical tubes joining the tanks near their outer ends and forming between the tanks a central vertical air space, a front plate substantially flush with the front edges of said tanks, a hood terminating rearwardly at said front plate, an inclosed exhaust fan beneath the lower tank having its front air-receiving face substantially flush with the dash-board, said lower tank having a relatively deep cut-out portion intermediate its ends and forward of the fan, whereby the air sucked in between the tubes will have an unobstructed vertical path downward to the front of said fan, and direct connections between the motor jackets and the tanks.

In testimony whereof I affix my signature in presence of two witnesses.

HERBERT C. COLBURN.

Witnesses:
B. L. GORICH,
E. A. COLBURN.

Copies of this patent may be obtained for five cents each, by addressing the "Commissioner of Patents, Washington, D. C."